United States Patent [19]

Wingbro et al.

[11] 4,000,815
[45] Jan. 4, 1977

[54] DEVICE FOR STORAGE AND TRANSPORT OF TEMPERATURE SENSITIVE GOODS

[75] Inventors: Torgny Wingbro, Hisingsbacka; Jan Hjalmarsson, Molndal; Per August Pettersson, Sodertalje, all of Sweden

[73] Assignee: AGA Aktiebolag, Lidingo, Sweden

[22] Filed: Jan. 28, 1976

[21] Appl. No.: 653,124

[30] Foreign Application Priority Data

Jan. 28, 1975 Sweden .............................. 7500863

[52] U.S. Cl. ............................... 206/205; 206/597
[51] Int. Cl.² ......................................... B65D 81/24
[58] Field of Search ................ 206/205, 386, 423; 220/9 F, 9 M

[56] References Cited
UNITED STATES PATENTS 3,416,692  12/1968  Cline et al. ..................... 206/386 X
3,764,000  10/1973  Jentsch ............................. 206/205

Primary Examiner—George T. Hall
Attorney, Agent, or Firm—Larson, Taylor and Hinds

[57] ABSTRACT

Apparatus for storage and transport of temperature sensitive goods comprises a load carrier pallet for supporting the goods, an upper insulating cover for covering the goods and the upper edge of the pallet, a lower cover enclosing the pallet and the lower part of the upper cover, and a sealing member between the facing surfaces of the upper and lower covers. A controllable arrangement for supplying a gaseous cooling medium is carried by the upper cover, whereby a blocking gas layer of cooling medium is maintainable around the goods. The sealing member preferably is gas permeable, and may comprise a Velcro fastener. Rubber bands or the like may be used also to connect the upper and lower covers. At least the upper cover is a laminated structure.

8 Claims, 4 Drawing Figures

DEVICE FOR STORAGE AND TRANSPORT OF TEMPERATURE SENSITIVE GOODS

FIELD OF THE INVENTION

The present invention relates to a device for storage and transport of temperature sensitive goods, wherein the goods are placed on a load carrier pallet, the goods being enclosed by a first insulating cover, which is designed to cover the goods and the upper edge of the pallet, and in which cover are arranged devices for the supply of a cooling medium, such as nitrogen, and for the control of the temperature within the cover.

SUMMARY OF THE INVENTION

The invention is substantially characterized in that the cover enclosing the goods is arranged to be enclosed at its lower part by a second cover, on which the pallet is placed, said second cover being fastened to the first cover by means of elastic members, and in that between the first and the second cover a gas permeable sealing member is arranged, by means of which the blocking gas layer around the goods, which is obtained by means of the cooling medium, effectively minimizes heat leakage from the surrounding area into the goods.

The invention is further characterized in that at least the first cover, which surrounds the goods, is constructed in such a way that the cover seen from the goods, comprises a surface layer, a reflecting layer, a binder layer, a web layer, an insulating layer, a web layer, a binder layer and a surface layer.

DESCRIPTION OF THE DRAWINGS

The invention will be described in detail in connection with the enclosed drawings, where

FIG. 1A is a detailed section of the cover structure, taken along A—A in FIG. 1;

DESCRIPTION OF A PREFERRED EMBODIMENT

Figure 1:
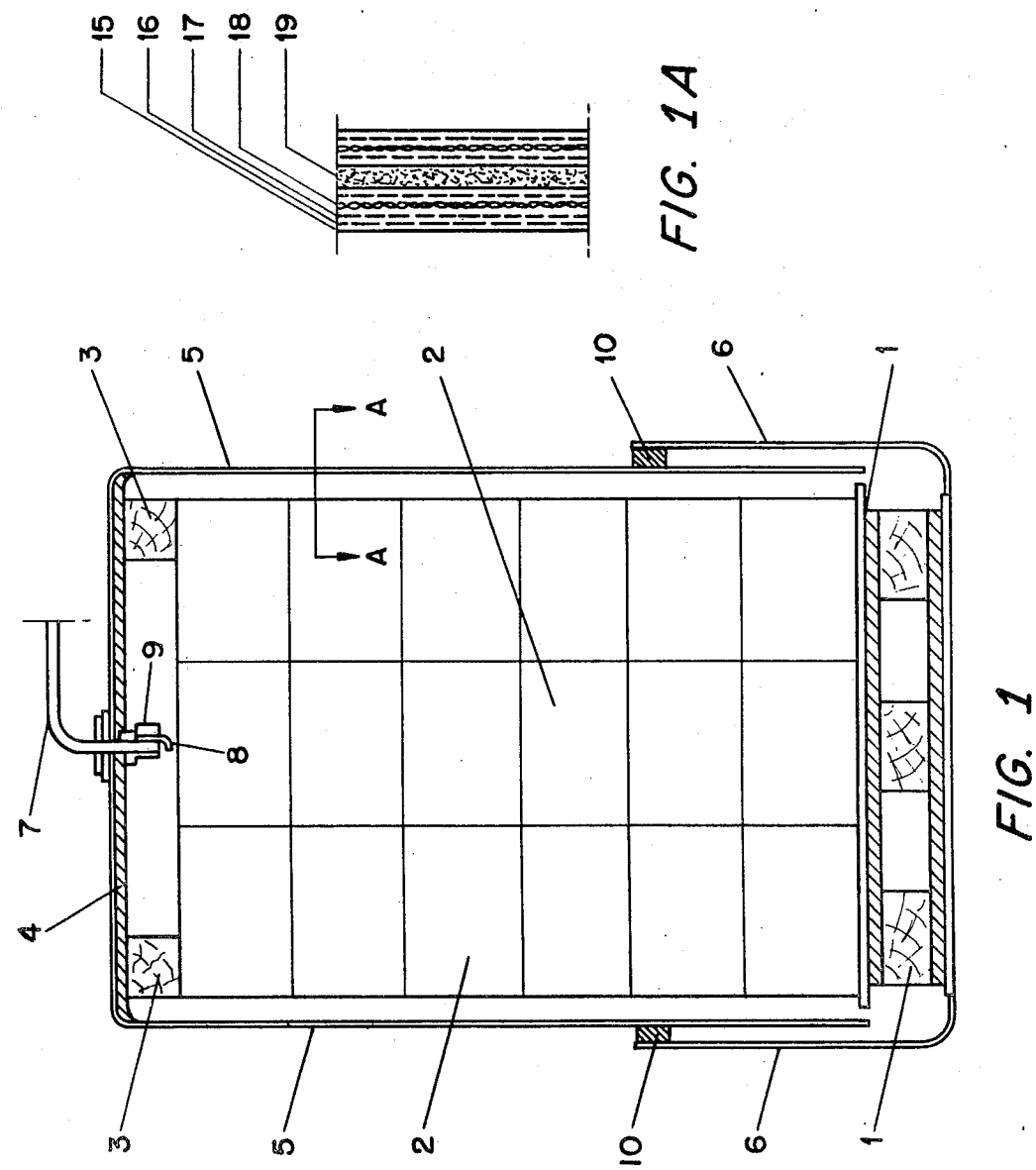
FIG. 1 shows a cross-section of a pallet loaded with goods and equipped with insulating covers and devices for the supply of a cooling medium and for control of the temperature.
Figure 2:
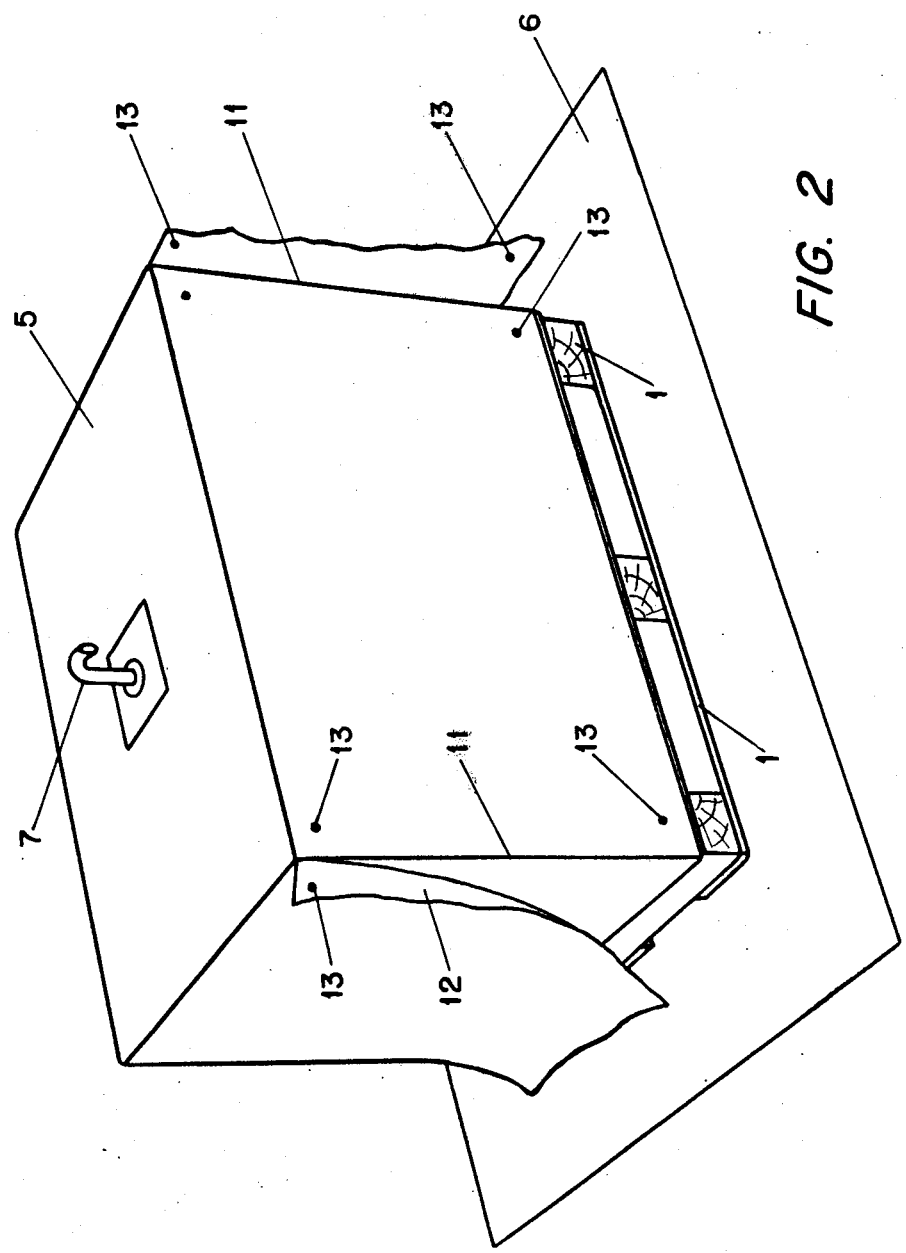
FIG. 2 shows the pallet loaded with goods and placed on the second lower cover, the first upper cover being placed over the goods.
Figure 3:
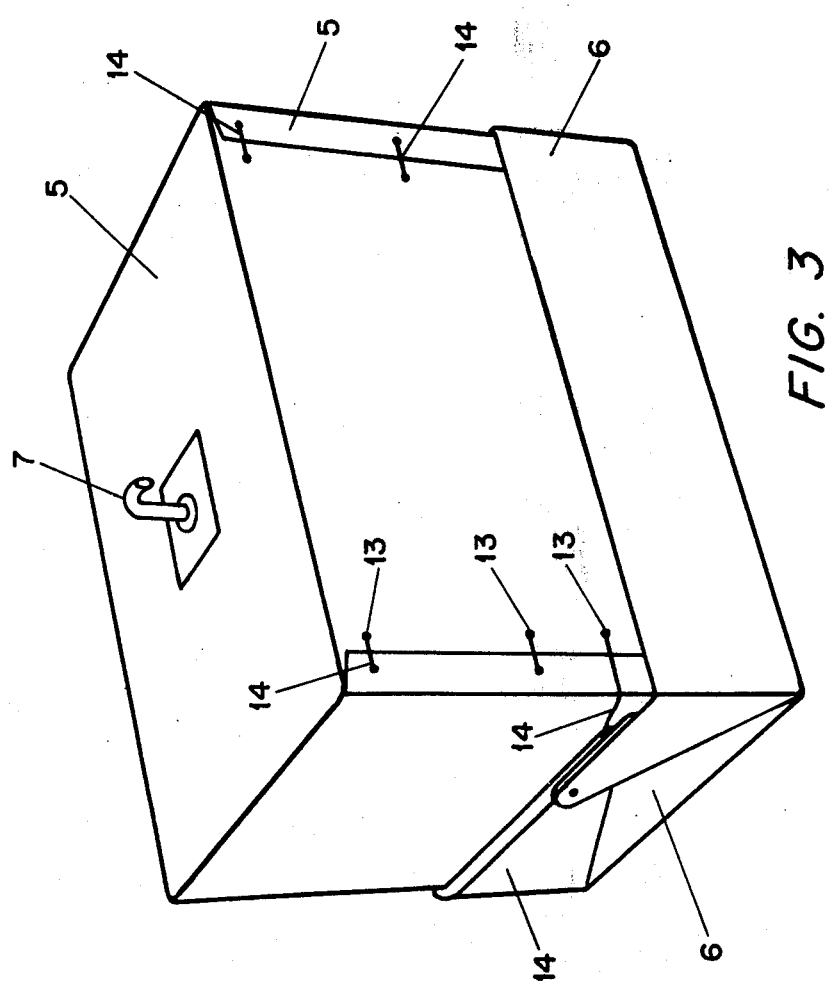
FIG. 3 shows the pallet loaded with goods and enclosed by the first and second covers.

FIG. 1 shows a cross-section of a loading pallet, on which temperature sensitive goods are placed, the goods comprising, for example, a number of cardboard boxes containing food. During storage and transport the goods must be kept at a certain temperature so as not to be damaged. The cover, which surrounds the goods, therefore must be constructed in such a way that the conditions within the cover, as regards temperature, humidity, smell, light, etc., are suitable for the goods to be stored and transported. The loading pallet 1 may suitably be a standard pallet, which can be handled with a fork-lift truck. The cover comprises two parts, an upper part 5 and a lower part 6. The upper cover 5 is fastened to a panel 4 which bears against the upper surface of the goods 2 via two spacers 3. The cover 5 encloses the side surface of the goods and stretches down to and covers the upper edge of the loading pallet. The structure of the upper cover 5 is shown in cross-section in FIG. 1A. Seen from the goods the cover comprises a surface layer 15 of, for example, polyurethan or other suitable plastic, a reflecting layer 16, a binder 17, a web 18 and an insulating layer 19 of plastic foam, for example, ethafoam, followed by a web, a binder and a surface layer of the same material as layer 15. This way a cover is obtained with very good temperature insulating properties, which prevents humidity and smell penetration from the surrounding area to the goods and which has a good light reflecting capacity. In the panel 4 is arranged a nozzle 8 connected to a cooling medium source, such as liquid nitrogen. In the panel is also arranged a temperature sensing member 9, such as a thermistor, which controls the supply of the cooling medium. The cover 5 is made-up to have in principle the same form as the loaded pallet. To facilitate the adaptation of the cover over the pallet the cover is cut along two of its vertical side-edges 11 (FIG. 2), one of the cut edges at both cut-open sides 11 being made to overlap the adjacent edge by means of a flap 12. The overlapping flaps 12 and the adjacent side areas are provided with holes 13, through which may be applied elastic members 14 (FIG. 3), such as rubber bands, in order to put the cover together.

As mentioned before the loading pallet with goods is also provided with a lower cover 6. Before being applied to the pallet the cover 6 is spread out (FIG. 2) whereafter the pallet is placed thereon by means of a fork-lift truck. When the upper cover 5 has been placed over the pallet and goods the lower cover 6 is turned up and folded in the way shown in FIG. 3. The lower cover 6 is also provided with holes 13, through which are applied elastic members 14, such as rubber bands, by means of which the flaps are held together and the cover 6 is pressed against cover 5, and by means of which the two covers may be connected. Between the lower cover and the upper cover is arranged a gas permeable sealing or fastening member 10 (FIG. 1), such as Velcro tape (a nylon material made with a surface of tiny hooks engageable with a complimentary surface of, for example, adhesive pile), which is designed to allow the nitrogen to leak out from the cover but to prevent heat from leaking in from the surrounding area.

By means of the cooling medium, which in the described example consists of nitrogen, a blocking layer is obtained around the temperature sensitive goods, which gas layer has the same temperature as the goods and prevents heat leakage from the surrounding area into the goods. By means of the cover according to the invention it is thus possible to effectively utilize the temperature preserving effect of the cooling medium on the goods. In addition to the insulation against heat the cover also gives good light reflection and prevents humidity and smell leakage into the goods. The make-up and construction of the cover are not limited to the shown and described example, but certain variations are possible within the scope of the invention, as will be apparent to those skilled in the art.

We claim:

1. Apparatus for storage and transport of temperature sensitive goods, comprising a load carrier pallet for supporting the goods, an upper insulating cover for covering the goods and the upper edge of said pallet, means in said upper cover for supplying a gaseous cooling medium to the interior thereof to control the temperature therein, a lower cover enclosing said pallet and the lower part of said upper cover, means fastening said lower cover to said upper cover, and a sealing member between the facing surfaces of said upper and lower covers, whereby a blocking gas layer of cooling medium is maintainable around the goods.

2. Apparatus as claimed in claim 1 wherein said lower cover is fastened to said upper cover by elastic members.

3. Apparatus as claimed in claim 1 wherein said sealing member is gas permeable so as to permit leakage of said gaseous cooling medium from the interior of said assembled covers.

4. Apparatus as claimed in claim 3 wherein said sealing member comprises a tear-away type fastener connecting said covers, the fastener comprising a tape of tiny plastic hook elements on one of said covers releasably grasping a complementary surface on the other cover.

5. Apparatus as claimed in claim 1 wherein said lower cover spans the bottom of said pallet and is folded upwardly around the lower part of said upper cover.

6. Appartus as claimed in claim 1 wherein at least said upper cover, seen from the goods, comprises a surface layer, a reflecting layer, a binder layer, a web layer, an insulating layer, a web layer, a binder layer, and a surface layer.

7. Apparatus as claimed in claim 6 wherein said surface layers are polyurethane.

8. Apparatus as claimed in claim 1 wherein said means in said upper cover comprise a nozzle for connection to a source of liquid nitrogen, and a temperature sensing member for controlling supply through said nozzle.

* * * * *